US009661464B2

(12) United States Patent
Lerenc (10) Patent No.: US 9,661,464 B2
(45) Date of Patent: May 23, 2017

(54) MATCHING MULTIPLE DEVICES TO IDENTIFY JOINT MOVEMENT OF THE MOBILE DEVICES

(71) Applicant: SAP SE, Walldorf (DE)

(72) Inventor: Vedran Lerenc, Schoenau (DE)

(73) Assignee: SAP SE, Walldorf (DE)

( * ) Notice: Subject to any disclaimer, the term of this patent is extended or adjusted under 35 U.S.C. 154(b) by 54 days.

(21) Appl. No.: 13/780,294

(22) Filed: Feb. 28, 2013

(65) Prior Publication Data

US 2014/0243020 A1  Aug. 28, 2014

(51) Int. Cl.
*H04W 4/02* (2009.01)
*H04W 4/04* (2009.01)

(52) U.S. Cl.
CPC ............. *H04W 4/023* (2013.01); *H04W 4/02* (2013.01); *H04W 4/027* (2013.01); *H04W 4/046* (2013.01)

(58) Field of Classification Search
CPC ....... H04W 4/02; H04W 4/023; H04W 4/206; H04W 64/00; H04L 67/22; G01S 5/0009; G01S 5/0027; G01S 5/0294
USPC .......................... 455/405, 456, 456.1, 456.3
See application file for complete search history.

(56) References Cited

U.S. PATENT DOCUMENTS

| | | | |
|---|---|---|---|
| 6,427,075 B1 * | 7/2002 | Burg et al. ................. 455/422.1 |
| 2003/0096621 A1 * | 5/2003 | Jana et al. ..................... 455/456 |
| 2008/0004793 A1 * | 1/2008 | Horvitz et al. ............... 701/200 |
| 2008/0081638 A1 * | 4/2008 | Boland et al. ............. 455/456.1 |
| 2008/0188261 A1 * | 8/2008 | Arnone ....................... 455/550.1 |
| 2008/0294302 A1 * | 11/2008 | Basir ....................... G01C 21/20 701/2 |
| 2009/0157496 A1 * | 6/2009 | Davis ..................... G06Q 10/10 705/14.61 |
| 2010/0075639 A1 * | 3/2010 | Horvitz et al. ............ 455/412.2 |
| 2010/0261485 A1 * | 10/2010 | Fernandes .................. 455/456.3 |
| 2010/0305807 A1 * | 12/2010 | Basir et al. .................... 701/33 |
| 2010/0330954 A1 * | 12/2010 | Manning Cassett et al. 455/405 |
| 2011/0004436 A1 * | 1/2011 | Beute ...................... G06F 3/017 702/141 |
| 2011/0016146 A1 * | 1/2011 | Teufel ................ G01C 21/3438 707/769 |
| 2011/0191237 A1 * | 8/2011 | Faith ...................... G06F 1/1694 705/39 |
| 2011/0246404 A1 * | 10/2011 | Lehmann ............... G06Q 10/02 706/21 |
| 2013/0190004 A1 * | 7/2013 | Papakipos ............. H04W 64/00 455/456.1 |

FOREIGN PATENT DOCUMENTS

TW    201007203 A  *  2/2010

* cited by examiner

*Primary Examiner* — Nathan Mitchell
*Assistant Examiner* — Ernest Tacsik
(74) *Attorney, Agent, or Firm* — Jones Day (57) ABSTRACT

Location data and/or acceleration data of a mobile device may be received. The data may include timestamps. The timestamped data of the mobile device may be compared to timestamped data of another mobile device. Upon determining the timestamped data of the mobile device matches the timestamped data of the other mobile device, joint movement of the mobile devices may be signaled.

20 Claims, 4 Drawing Sheets

MATCHING MULTIPLE DEVICES TO IDENTIFY JOINT MOVEMENT OF THE MOBILE DEVICES

BACKGROUND INFORMATION

General location based services allow for the determination of the location of a user on a specific client device. These location based services allow for the ability to locate and identify where the client device is being used within some level of precision or tolerance. These location based services are restrictive however, as they are unable to enable any sort of coupling with other devices traveling in the same vicinity as the client device. Therefore current implementations are unable to match together multiple mobile devices to identify joint movement of the devices.

A trip sharing service is an example of an application that incorporates a complex system that may be effectively implemented in conjunction with mobile devices. An application can generate a shared trip for drivers and passengers based on receiving a service request for a potential trip and matching the service request to a preexisting trip. The trip service may be designed to maximize the users' convenience in the organization of shared trips, by finding an appropriate trip for a user, as well as appropriate passengers on each trip. If multiple users did take a ride together in the trip service, it would be of particular help to have a system that would recognize and confirm that the multiple users did jointly travel together. Unfortunately, currently implemented location based services do not provide for this.

Thus, there remains a need in the art for a system and method for identifying joint movement of mobile devices. There also remains a need in the art for a system and method to identify joint movement of mobile devices in conjunction for use in a trip sharing service.

DETAILED DESCRIPTION

The subject matter will now be described in detail for specific preferred embodiments, it being understood that these embodiments are intended only as illustrative examples and are not to be limited thereto.

Embodiments may be discussed in systems to determine joint movement of multiple mobile devices. In an embodiment, location data and/or acceleration data of a mobile device may be received. The data may include timestamps. The timestamped data of the mobile device may be compared to timestamped data of another mobile device. Upon determining the timestamped data of the mobile device matches the timestamped data of the other mobile device, joint movement of the mobile devices may be signaled.

In an embodiment, the timestamped data of the mobile device may be received at predefined intervals. In an embodiment, the timestamped data of the mobile device and the timestamped data of the other mobile device may be synchronized. In an embodiment, the timestamped data of the mobile device and the timestamped data of the other mobile device may not be synchronized. In an embodiment, the timestamped data of the mobile device and the timestamped data of the other mobile device may be matched based on a time shift. In an embodiment, the timestamped data of the mobile device and the timestamped data of the other mobile device may be matched within a tolerance level.

Figure 1:
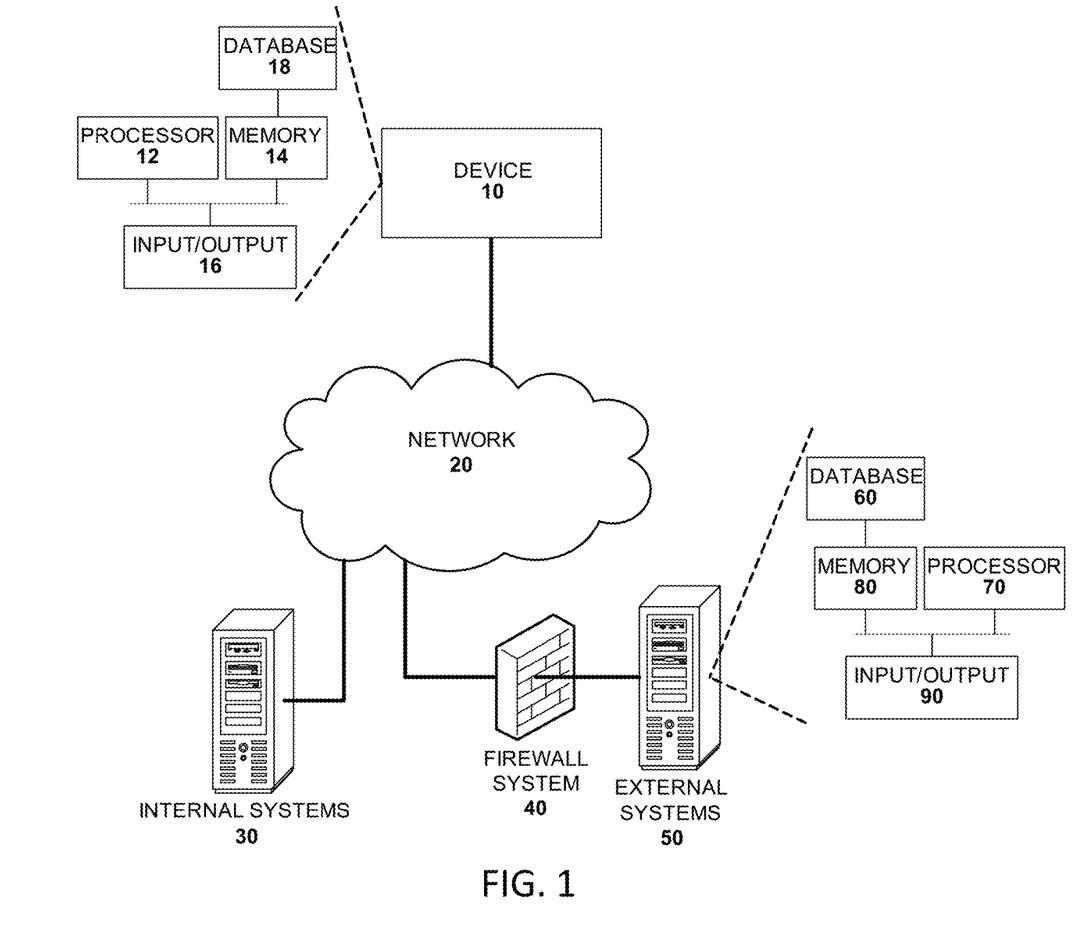
FIG. 1 is a diagram of a system in which a mobile device connects to a backend system to ascertain joint movement of the mobile device according to an embodiment of the present invention.

FIG. 1 illustrates an architecture of the system for identifying the location of a mobile device and linking to joint movement of other mobile devices. In an embodiment, device 10 may be a hand-held device, personal digital assistant (PDA), television set-top Internet appliance, mobile telephone, smart phone, tablet, ANDROID™ device, IPOD™, IPHONE™, IPAD™, WINDOWS™ based device, etc., or as a combination of one or more thereof, or other comparable device. A mobile application, such as for example, a trip sharing service or other type of application, may be executed on device 10. This mobile application may be displayed in a user interface that is displayed on a screen of the device 10.

Determining a location of the device 10 may be made by connecting the device 10 to backend computer systems or networks to identify the geographic location of the device 10. Identification of the geographic location of the device may be made through location based services using GPS technology, where, for example, device 10 may connect directly to a satellite, with the geographic position and other location data being transmitted back to device 10 which transmits this data to the backend system, or alternately, the backend system itself may connect to a satellite. Upon identification of a single location of device 10, this location may be stored in a memory 80. Different determined locations for device 10 may be used to generate a movement profile of device 10 in the mobile application. The movement profile may communicate with the backend system to provide information as to the movement of the phone, in particularly past movement of device 10.

In an embodiment, device 10 may also include accelerometers built into the device. These accelerometers may be used to track the acceleration of the device 10, which may be stored with the other location data included in the determined geographic location of device 10.

Determined locations of device 10, including geographic data, as well as any acceleration related data, may be stored in one or more databases in the backend system. When the data is retrieved, the location data may be translated to a data protocol by a gateway that may be part of a firewall system 40. Device 10 may connect to a gateway through a platform that provides a secured connection for connectivity.

The backend systems storing possible location data may be separated into internal backend systems and external backend systems. Device 10 may connect to internal backend systems 30 through a network 20. Device 10 may also connect to external backend systems 50 through the network 20 and a firewall system 40. In an embodiment, network 20 may be implemented as a cellular network, WLAN network, short range communication network (i.e. BLUETOOTH®) or a combination of different wired and/or wireless networks. The firewall system 40 may include a gateway and a platform to translate the location data to a data protocol and provide a secured connection.

The internal backend systems 30 may include a server and may provide location based data including the geographic location data. The external backend systems 50 may include a server, and may also contain location based data tracking of device 10. The application on device 10 may interact with these external systems to obtain updates on the location of device 10, through a firewall system 40 separating the internal systems from the external systems. The gateway and platform provided by the firewall system 40 allow for a secure transmission of the GPS location data to device 10.

Device 10 may include a processor 12, a memory 14, and input/output interface 16, and a database 18. Database 18 may include any type of data storage adapted to searching and retrieval. In an example embodiment, determined location data and/or accelerometer data may be stored directly on device 10 in database 18 or memory 14, which may have a designated storage capacity. When the mobile application accesses the locally saved location data and/or accelerometer data, processor 12 may retrieve the data from memory 14. In an embodiment, memory 14 may contain different components for retrieving, presenting, changing, and saving the local data. Memory 14 may include a variety of memory devices, for example, Dynamic Random Access Memory (DRAM), Static RAM (SRAM), flash memory, cache memory, and other memory devices. In an embodiment, memory 14 may be a memory device that may be easily incorporated in a mobile device.

The backend systems 30 and 50 may both contain a processor 70, memory 80, a database 60, and an input/output interface 90, all of which may be interconnected via a system bus. In various embodiments, both of the systems 30 and 50 may have an architecture with modular hardware or software systems that include additional systems communicating through one or more networks. The modular design may enable a business to add, exchange, and upgrade systems, including using systems from different vendors in some embodiments. The architecture may include embodiments that have different configurations than the example embodiment depicted in FIG. 1.

In an embodiment, memory 80 may contain different components for retrieving, presenting, changing, and saving the location data. Memory 80 may include a variety of memory devices, for example, Dynamic Random Access Memory (DRAM), Static RAM (SRAM), flash memory, cache memory, and other memory devices. Additionally, for example, memory 80 and processor 70 may be distributed across several different computers that collectively comprise a system.

Database 60 may include any type of data storage adapted to searching and retrieval. The databases of internal backend systems 30 and external backend system 50 may store location data for retrieval by the application executed on device 10.

Processor 70 may perform computation and control functions of a system and comprises a suitable central processing unit. Processor 70 may comprise a single integrated circuit, such as a microprocessor, or may comprise any suitable number of integrated circuit devices or circuit boards working in cooperation to accomplish the functions of a processor. Processor 70 may execute computer programs, such as object-oriented computer programs, within memory 80.

Figure 2:
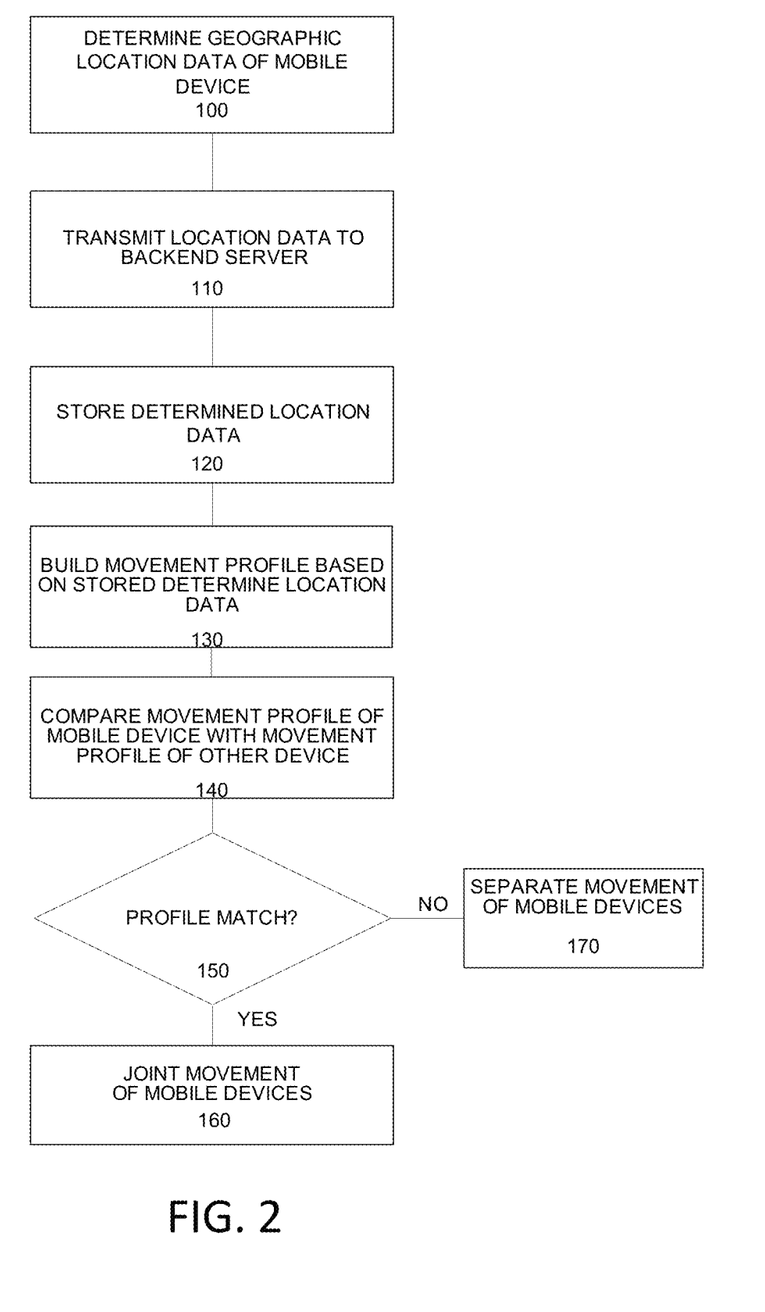
FIG. 2 is a diagram of the process of matching joint movement of multiple mobile devices according to an embodiment of the present invention.

FIG. 2 illustrates a diagram of a process for identifying joint movement of multiple mobile devices according to an embodiment. In step 100, the geographic location of mobile device 10 may be determined. The location may be determined, in particular, through the use of location based services such as GPS or known WiFi hotspots in the vicinity. In an embodiment, these location based services may be integrated directly into device 10. These location based services may track the geographic location used to fingerprint the movement of device 10. In an embodiment, the geographic location of device 10 may be determined up to some tolerance to the exact location of the device.

In step 110, the acquired location data may be transmitted back from the device to a backend server. In an embodiment where the backend server connects directly with a satellite, a determined geographic location may be transmitted directly to the backend server. In an embodiment, the geographic location data may be timestamped, which may provide information as to what exact point in time the device 10 was at a given location. In step 120, the timestamped determined geographic location(s) may be stored in database 60 and/or memory 80 of the backend system.

In an example embodiment, the geographic location may be transmitted to the backend server as samples with a designed certain sampling frequency, for example, once per ten seconds. In this example embodiment, every ten seconds, the latitude and longitude of device 10 may be sampled along with a designated timestamp. In an embodiment, transmission to the backend server may be made offline or with a lower frequency to conserve battery power.

In step 130, based on the collected location data, the backend server may build a movement profile of device 10 for a particular time period. In an embodiment, the time period may be based on travel from a first location to a second location, which may be referred to as a "ride." The start and end of the ride may be conveyed to the backend server through, for instance, a communication link between a vehicle and the backend server and/or communication between the device 10 and the communication server. For example, the driver of the vehicle may activate a fare meter which automatically transmits information to the backend server to indicate that the ride has commenced and the driver of the vehicle may deactivate the fare meter which automatically transmits information to the backend server to indicate that the ride has terminated. In other exemplary embodiments, the start and end of a ride may be conveyed to the backend server via activation/deactivation of a navigation device in the vehicle, activation/deactivation of a navigation service built into the device 10, information previously entered into ride scheduling software such as carpooling software, etc.

In step 140, the movement profile of the device 10 may be compared to a corresponding movement profile of another device by the backend server. In an embodiment, this comparison may be made by processor 70, with timestamped geographic location data of other devices also being stored in database 60 and memory 80. The comparison of movement profiles of device 10 with another device may allow for a determination of whether the mobile devices travelled together. In an example embodiment, the backend server may loop through the timestamped geographic locations from a movement profile of device 10 and compare the geographic locations of device 10 with the geographic locations from the corresponding movement profile of the other device. The comparison may be performed on a combination of geographic and temporal dimensions.

If the movement profiles of the compared devices match in step 150, the backend server may determine the two or more mobile devices were travelling together and therefore there was joint movement of the devices 160. If the movement profiles of the compared devices do not match in step 150, the system may determine that there was no joint movement of the devices 170.

At step 150, two movement profiles may be determined as matching if the geographic/temporal data in each profile is within a comparison tolerance. In an embodiment, the internal clock of the two compared devices may be synchronized and the timestamped geographic data may be transmitted from the two devices to the backend server at essentially the same time intervals. In this embodiment, the backend server may determine that the movement profiles of the devices match if each geographic data point in the first movement profile and the corresponding geographic data point in the second movement profile are within a geographic tolerance level. For example, the first timestamped geographic data point of the first profile may be geographic location x with timestamp y. The first timestamped geographic data point of the second profile may be geographic location x+1 with timestamp y. The tolerance level associated with the geographic dimension may be k. Therefore, the backend server may determine that the first timestamped geographic data point of the first profile and the first timestamped geographic data point of the second profile match if $|(x)-(x+1)|<k$. A person having ordinary skill in the art will appreciate that the geographic location associated with a particular timestamp is represented as a single data point for illustrative purposes. The geographic location associated with a particular timestamp may be have multiple data points such as a latitude data point and a longitude data point. Similarly, the geographic tolerance level may be a function of both longitude and latitude.

Figure 3:
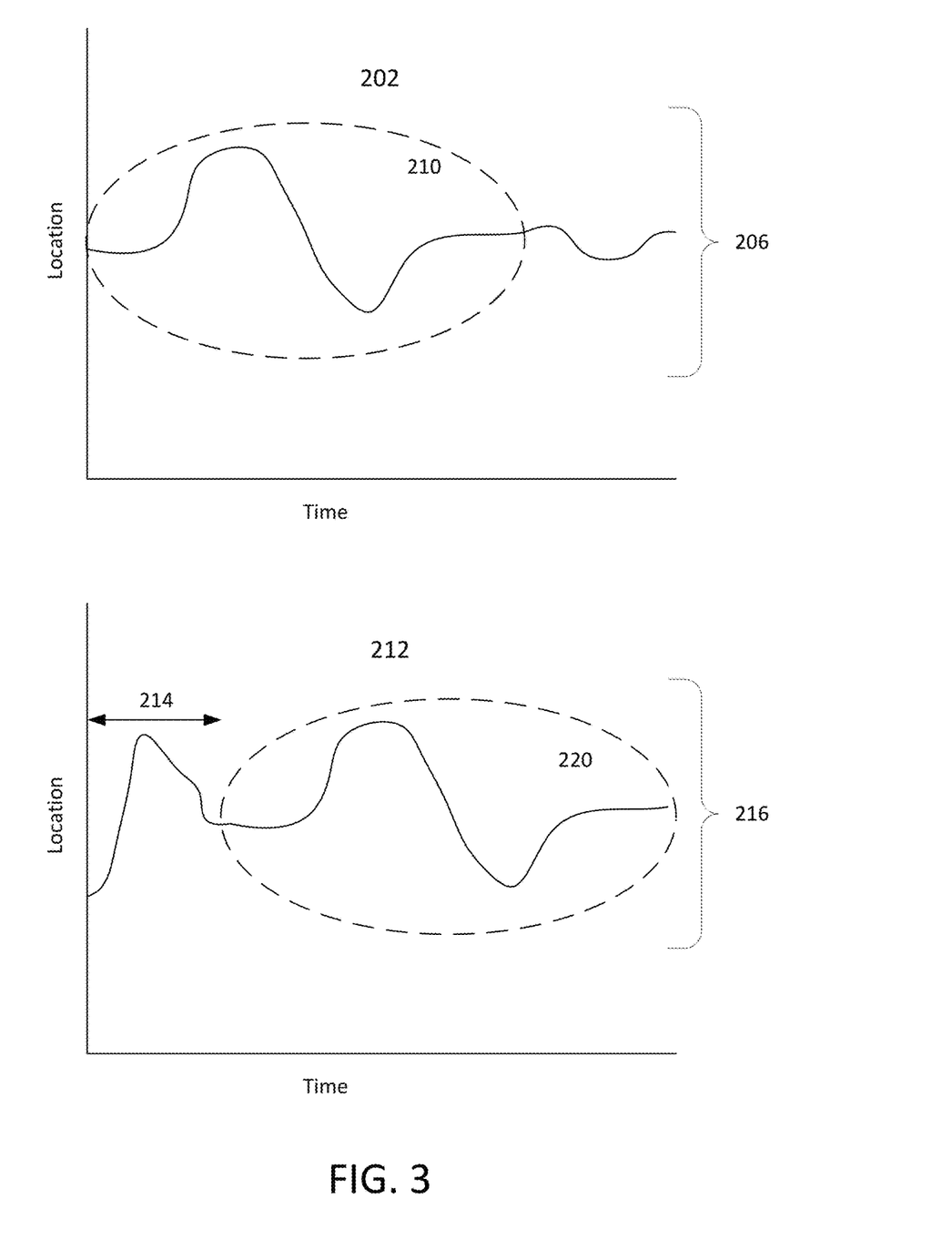
FIG. 3 illustrates graphs of timestamped geographic data of two non-synchronized devices according to an embodiment.

In other embodiments, the internal clock of the two compared devices may not be synchronized and/or the timestamped geographic data may be transmitted from the two devices to the backend server at different time intervals. FIG. 3 illustrates graphs, 202 and 212, of timestamped geographic data belonging to two respective non-synchronized devices according to an embodiment. In this embodiment, the backend server may account for a static time shift 214 and determine that the movement profiles, 206 and 216, of the devices match if a sequence of geographic data points 210 in the first movement profile and a sequence of geographic data points 220 in the second movement profile match (within a tolerance level) even if the sequence of data points are in different time intervals of the respective profiles.

Figure 4:
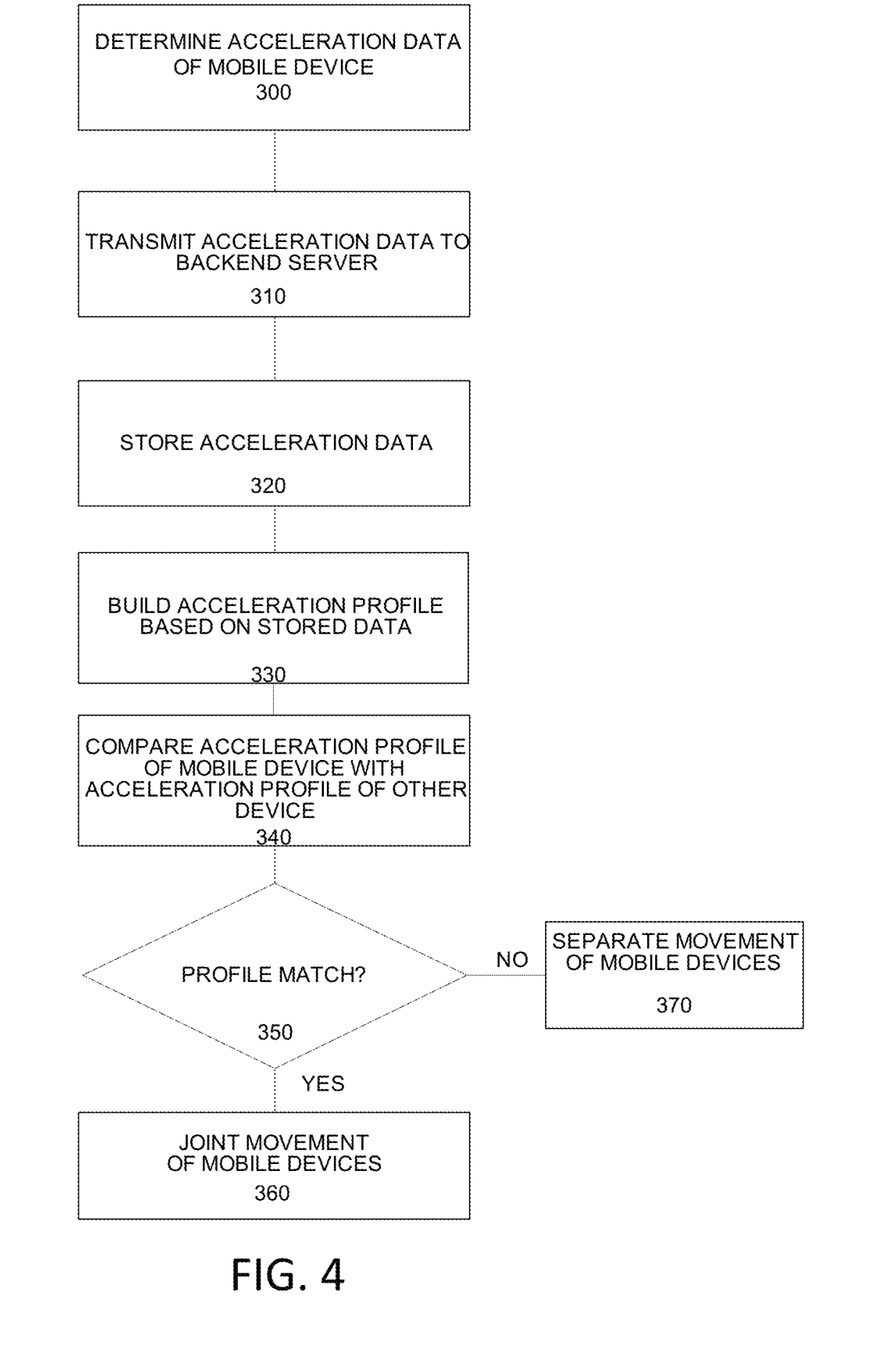
FIG. 4 is a diagram of the process of matching joint movement of multiple mobile devices according to an embodiment of the present invention.

FIG. 4 illustrates a diagram of a process for identifying joint movement of multiple mobile devices according to an embodiment. In step 300, the acceleration data of mobile device 10 may be determined by, for example, an accelerometer. In an embodiment, the accelerometer may be integrated directly into device 10. The acceleration data may be utilized to fingerprint the movement of device 10. In an embodiment, the acceleration of device 10 may be determined up to some tolerance.

In step 310, the acquired acceleration data may be transmitted back from the device to a backend server. In an embodiment, the acceleration data may be timestamped, which may provide information as to what exact point in time the device 10 accelerated/decelerated. The acceleration data may include a magnitude and direction of the acceleration. In an embodiment, the acceleration data may be transmitted only if the acceleration exceeds a predetermined magnitude. In an embodiment, the acceleration may only be transmitted if the acceleration is in one or more predetermined directions. For example, during normal planar movement, the acceleration in the Z axis (earth's gravitational force) may be omitted. The acceleration on an X axis and a Y axis may be transformed into radian acceleration (normalized to the magnetic north pole). Every acceleration and deceleration above a certain threshold of, e.g., +/−0.5 g (absolute), may then be transmitted to the backend server. In step 320, the timestamped acceleration data may be stored in database 60 and/or memory 80 of the backend system.

In an example embodiment, the acceleration data may be transmitted to the backend server as samples with a designed certain sampling frequency, for example, once per ten seconds. In this example embodiment, every ten seconds, the acceleration of device 10 may be sampled along with a designated timestamp. In an embodiment, transmission to the backend server may be made offline or with a lower frequency to conserve battery power.

In step 330, based on the collected acceleration data, the backend server may build an acceleration profile of device 10 for a particular time period. In an embodiment, the time period may be based on the commencement and termination of a ride as discussed previously.

In step 340, the acceleration profile of the device 10 may be compared to a corresponding acceleration profile of another device by the backend server. In an embodiment, this comparison may be made by processor 70, with timestamped acceleration data of other devices also being stored in database 60 and memory 80. The comparison of acceleration profiles of device 10 with another device may allow for a determination of whether the mobile devices travelled together. In an example embodiment, the backend server may loop through the timestamped accelerations from an acceleration profile of device 10 and compare the accelerations of device 10 with the accelerations from the corresponding acceleration profile of the other device. The comparison may be performed on a combination of acceleration and temporal dimensions.

If the acceleration profiles of the compared devices match in step 350, the backend server may determine the two or more mobile devices were travelling together and therefore there was joint movement of the devices 360. If the acceleration profiles of the compared devices do not match in step 350, the system may determine that there was no joint movement of the devices 370.

At step 350, two acceleration profiles may be determined as matching if the acceleration/temporal data in each profile is within a comparison tolerance. In an embodiment, the internal clock of the two compared devices may be synchronized and the timestamped acceleration data may be transmitted from the two devices to the backend server at essentially the same time intervals. In this embodiment, the backend server may determine that the acceleration profiles of the devices match if each acceleration data point in the first movement profile and the corresponding acceleration data point in the second movement profile are within a tolerance level. For example, the first timestamped acceleration data point of the first profile may be acceleration x with timestamp y. The first acceleration data point of the second profile may be acceleration x+1 with timestamp y. The tolerance level associated with the acceleration dimension may be k. Therefore, the backend server may determine that the first timestamped acceleration data point of the first profile and the first timestamped acceleration data point of the second profile match if $|(x)-(x+1)|<k$. A person having ordinary skill in the art will appreciate that the acceleration associated with a particular timestamp is represented as a single data point for illustrative purposes. The acceleration associated with a particular timestamp may be have multiple data points such as a magnitude data point and a direction data point. Similarly, the acceleration tolerance level may be a function of both magnitude and direction.

In other embodiments, the internal clock of the two compared devices may not be synchronized. In these embodiments, the backend server may account for a static time shift and determine that the acceleration profiles of the devices match if a sequence of acceleration data points in the first acceleration profile and a sequence of acceleration data points in the second acceleration profile match (within a tolerance level) even if the sequence of data points are in different temporal intervals of the respective profiles.

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the spirit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A computer-implemented method for determining joint movement of multiple mobile devices, the method comprising:

receiving first timestamped data that indicate both of location data and acceleration data from a first mobile device, and determining a first movement profile and a first acceleration profile of the first mobile device based on the first timestamped data, the first movement profile specifying a plurality of locations at which the first mobile device was located over a first period of time and the first acceleration profile specifying acceleration measurements of the first mobile device over a second period of time, wherein the first movement profile comprises a series of paired start timestamps and end timestamps corresponding to each of a plurality of rides, the start timestamps being automatically transmitted to a backend server by a mobile device associated with a driver upon commencement of the corresponding ride and the end timestamps being automatically transmitted to the backend server by such mobile device associated with the driver upon termination of the corresponding ride;

receiving second timestamped data that indicate both of location data and acceleration data from a second mobile device, and determining a second movement profile and a second acceleration profile of the second mobile device based on the second timestamped data, the second movement profile specifying a plurality of locations at which the second mobile device was located over a third period of time and the second acceleration profile specifying acceleration measurements of the second mobile device over a fourth period of time, wherein the second movement profile comprises a series of paired start timestamps and end timestamps corresponding to each of a plurality of rides, the start timestamps being automatically transmitted to a backend server by a mobile device associated with a driver upon commencement of the corresponding ride as indicated by activation of a navigation device and the end timestamps being automatically transmitted to the backend server by the mobile device associated with such driver upon termination of the corresponding ride as indicated by deactivation of the navigation device;

comparing the first and second movement profiles using a combination of geographic and temporal dimensions;

comparing the first and second acceleration profiles using a combination of acceleration and temporal dimensions;

processing the acceleration and movement profiles to determine if there is a match between both of 1) the first and second movement profiles and 2) the first and second acceleration profiles, signaling joint movement of the first and second mobile devices if the match is determined, wherein first and second timestamped data are one of 1) synchronized and 2) not synchronized;

determining whether a ridesharing service is available based upon the determined match; and transmitting a ridesharing option to the first and second mobile devices if the ridesharing service is available.

2. A computer-implemented method for determining joint movement of multiple mobile devices, the method comprising:

receiving first timestamped data that indicate both of location data and acceleration data from a first mobile device, and determining a first movement profile and a first acceleration profile of the first mobile device based on the first timestamped data, the first movement profile specifying a plurality of locations at which the first mobile device was located over a first period of time and the first acceleration profile specifying acceleration measurements of the first mobile device over a second period of time, wherein the first movement profile comprises a series of paired start timestamps and end timestamps corresponding to each of a plurality of rides, the start timestamps being automatically transmitted to a backend server by a mobile device associated with a driver upon commencement of the corresponding ride as indicated by activation of a navigation device and the end timestamps being automatically transmitted to the backend server by such mobile device associated with the driver upon termination of the corresponding ride as indicated by deactivation of the navigation device;

receiving second timestamped data that indicate both of location data and acceleration data from a second mobile device, and determining a second movement profile and a second acceleration profile of the second mobile device based on the second timestamped data, the second movement profile specifying a plurality of locations at which the second mobile device was located over a third period of time and the second acceleration profile specifying acceleration measurements of the second mobile device over a fourth period of time, wherein the second movement profile comprises a series of paired start timestamps and end timestamps corresponding to each of a plurality of rides, the start timestamps being automatically transmitted to a backend server by a mobile device associated with a driver upon commencement of the corresponding ride and the end timestamps being automatically transmitted to the backend server by the mobile device associated with such driver upon termination of the corresponding ride;

comparing the first and second movement profiles using a combination of geographic and temporal dimensions;

comparing the first and second acceleration profiles using a combination of acceleration and temporal dimensions;

processing the acceleration and movement profiles to determine if there is a match between both of 1) the first and second movement profiles and 2) the first and second acceleration profiles, signaling joint movement of the first and second mobile devices if the match is determined;

determining whether a ridesharing service is available based upon the determined match; and transmitting a ridesharing option to the first and second mobile devices if the ridesharing service is available.

3. The method according to claim 2, wherein the timestamped data of the first mobile device is received at predefined intervals.

4. The method according to claim 2, wherein the timestamped data of the first mobile device and the timestamped data of the second mobile device are synchronized based on internal clocks of the first mobile device and the second mobile device being synchronized.

5. The method according to claim 2, wherein the timestamped data of the first mobile device and the timestamped data of the second mobile device are not synchronized.

6. The method according to claim 5, wherein the timestamped data of the first mobile device and the timestamped data of the second mobile device are matched based on a time shift.

7. The method according to claim 2, wherein the timestamped data of the first mobile device and the timestamped data of the second mobile device are matched within a tolerance level.

8. An apparatus comprising:
a processor to:
receive first timestamped data that indicate both of location data and acceleration data from a first mobile device, and determine a first movement profile and a first acceleration profile of the first mobile device based on the first timestamped data, the first movement profile specifying a plurality of locations at which the first mobile device was located over a first period of time and the first acceleration profile specifying acceleration measurements of the first mobile device over a second period of time, wherein the first movement profile comprises a series of paired start timestamps and end timestamps corresponding to each of a plurality of rides, the start timestamps being automatically transmitted to a backend server by a mobile device associated with a driver upon commencement of the corresponding ride as indicated by activation of a navigation device and the end timestamps being automatically transmitted to the backend server by such mobile device associated with the driver upon termination of the corresponding ride as indicated by deactivation of the navigation device;

receive second timestamped data that indicate both of location data and acceleration data from a second mobile device, and determining a second movement profile and a second acceleration profile of the second mobile device based on the second timestamped data, the second movement profile specifying a plurality of locations at which the second mobile device was located over a third period of time and the second acceleration profile specifying acceleration measurements of the second mobile device over a fourth period of time, wherein the second movement profile comprises a series of paired start timestamps and end timestamps corresponding to each of a plurality of rides, the start timestamps being automatically transmitted to a backend server by a mobile device associated with a driver upon commencement of the corresponding ride and the end timestamps being automatically transmitted to the backend server by the mobile device associated with such driver upon termination of the corresponding ride;

compare the first and second movement profiles using a combination of geographic and temporal dimensions;

compare the first and second acceleration profiles using a combination of acceleration and temporal dimensions;

process the acceleration and movement profiles to determine if there is a match between both of 1) the first and second movement profiles and 2) the first and second acceleration profiles, signal joint movement of the first and second mobile devices if the match is determined;

determine whether a ridesharing service is available based upon the determined match; and transmit a ridesharing option to the first and second mobile devices if the ridesharing service is available.

9. The apparatus of claim 8, wherein the timestamped data of the mobile device is received at predefined intervals.

10. The apparatus of claim 8, wherein the timestamped data of the mobile device and the timestamped data of the other mobile device are synchronized.

11. The apparatus of claim 8, wherein the timestamped data of the mobile device and the timestamped data of the other mobile device are not synchronized.

12. The apparatus of claim 11, wherein the timestamped data of the mobile device and the timestamped data of the other mobile device are matched based on a time shift.

13. The apparatus of claim 8, wherein the timestamped data of the mobile device and the timestamped data of the other mobile device are matched within a tolerance level.

14. A non-transitory computer-readable medium embodied with computer-executable instructions for causing a computer to execute instructions, the computer instructions comprising:

receiving first timestamped data that indicate both of location data and acceleration data from a first mobile device, and determining a first movement profile and a first acceleration profile of the first mobile device based on the first timestamped data, the first movement profile specifying a plurality of locations at which the first mobile device was located over a first period of time and the first acceleration profile specifying acceleration measurements of the first mobile device over a second period of time, wherein the first movement profile comprises a series of paired start timestamps and end timestamps corresponding to each of a plurality of rides, the start timestamps being automatically transmitted to a backend server by a mobile device associated with a driver upon commencement of the corresponding ride as indicated by activation of a fare meter and the end timestamps being automatically transmitted to the backend server by such mobile device associated with the driver upon termination of the corresponding ride as indicated by deactivation of the fare meter;

receiving second timestamped data that indicate both of location data and acceleration data from a second mobile device, and determining a second movement profile and a second acceleration profile of the second mobile device based on the second timestamped data, the second movement profile specifying a plurality of locations at which the second mobile device was located over a third period of time and the second acceleration profile specifying acceleration measurements of the second mobile device over a fourth period of time, wherein the second movement profile comprises a series of paired start timestamps and end timestamps corresponding to each of a plurality of rides, the start timestamps being automatically transmitted to a backend server by a mobile device associated with a driver upon commencement of the corresponding ride and the end timestamps being automatically transmitted to the backend server by the mobile device associated with such driver upon termination of the corresponding ride;

comparing the first and second movement profiles using a combination of geographic and temporal dimensions;

comparing the first and second acceleration profiles using a combination of acceleration and temporal dimensions;

processing the acceleration and movement profiles to determine if there is a match between both of 1) the first and second movement profiles and 2) the first and second acceleration profiles, signaling joint movement of the first and second mobile devices if the match is determined;

determining whether a ridesharing service is available based upon the determined matched; and transmitting a ridesharing option to the first and second mobile devices if the ridesharing service is available.

15. The computer-readable medium of claim 14, wherein the timestamped data of the mobile device is received at predefined intervals.

16. The computer-readable medium of claim 14, wherein the timestamped data of the mobile device and the timestamped data of the other mobile device are synchronized.

17. The computer-readable medium of claim 14, wherein the timestamped data of the mobile device and the timestamped data of the other mobile device are not synchronized.

18. The computer-readable medium of claim 17, wherein the timestamped data of the mobile device and the timestamped data of the other mobile device are matched based on a time shift.

19. The computer-readable medium of claim 14, wherein the timestamped data of the mobile device and the timestamped data of the other mobile device are matched within a tolerance level.

20. The method of claim 1, wherein the first mobile device and the second mobile device each respectively comprise a GPS sensor for generating the location data and an accelerometer for generating the acceleration data.

* * * * *